United States Patent [19]
McConnell et al.

[11] Patent Number: 5,249,936
[45] Date of Patent: Oct. 5, 1993

[54] DOWNHOLD RECIPROCATING PUMP WITH AUTOMATICALLY TRIPPABLE TRAVELLING VALVE FOR PREVENTION OF GAS LOCK

[76] Inventors: Kenneth R. McConnell, 8532 - 67 Avenue, Edmonton, Alberta, Canada, T6E 0M8; Douglas A. Jensen, 9017 - 60 Street, Edmonton, Alberta, Canada, T6C 3L8

[21] Appl. No.: 891,579

[22] Filed: Jun. 1, 1992

Related U.S. Application Data

[63] Continuation-in-part of Ser. No. 529,497, May 29, 1990, Pat. No. 5,117,861.

[51] Int. Cl.⁵ .................................................. F04B 7/00
[52] U.S. Cl. ...................................... 417/444; 417/552
[58] Field of Search ................... 417/444, 445, 552; 137/516.25, 516.29

[56] References Cited

U.S. PATENT DOCUMENTS

| | | | |
|---|---|---|---|
| 1,014,271 | 1/1912 | Waitz | 417/444 |
| 1,662,942 | 3/1928 | Snoddy | 417/444 |
| 5,141,411 | 8/1992 | Klaeger | 417/445 |

*Primary Examiner*—Robert G. Nilson
*Attorney, Agent, or Firm*—Dennis T. Griggs

[57] ABSTRACT

The travelling check valve of the pump is adapted to be automatically opened at the bottom of the down stroke, so that gasses trapped between the travelling and standing check valves may escape and eliminate gas locking. The valve member of the travelling check valve is provided with a downwardly extending, axial stem. The barrel carries a stationary pin extending transversely across its bore just above the standing check valve. The pump piston, carrying the travelling check valve, brings the stem into contact with the pin as the piston reaches the bottom of its down stroke. This causes the valve member to temporarily unseat until the piston commences the up stroke.

12 Claims, 6 Drawing Sheets

DOWNHOLD RECIPROCATING PUMP WITH AUTOMATICALLY TRIPPABLE TRAVELLING VALVE FOR PREVENTION OF GAS LOCK

CROSS-REFERENCE TO RELATED APPLICATION

This is a continuation-in-part of application Ser. No. 07/529,497, filed May 29, 1990 now U.S. Pat. No. 5,117,861.

FIELD OF THE INVENTION

This invention relates to a down-hole reciprocating pump. More specifically, it relates to a down-hole reciprocating pump having a travelling check valve which may be automatically and temporarily opened at the base of the down stroke, to allow trapped gas to escape from the pump, to pretent "gas locking".

BACKGROUND OF THE INVENTION

Down-hole reciprocating pumps are commonly used for moving fluid from the bottom of a well bore up to the ground surface, as is well known in the art.

In general, a conventional pump of this kind comprises a tubular reciprocating piston slidably received within a tubular pump barrel. The piston is attached at its upper end to the lower end of the rod string, for reciprocation thereby. The barrel seats at its upper end in a seating nipple forming part of the wellbore tubing string. The piston has a close fit within the barrel, so that it effectively seals against the barrel wall and functions to lift fluid above it on the up stroke. A travelling check valve is positioned in the bore of the piston, commonly at its lower end, and functions to control the ingress of fluid into the piston bore. A standing check valve is positioned at the lower end of the pump barrel bore and functions to control the ingress of fluid into the barrel bore beneath the piston. These valves are commonly one-way check valves with a ball and seat structure.

In operation, when the piston is on the down stroke, the ball of the travelling check valve unseats and the hydrostatic head, arising from the column of fluid in the tubing, keeps the ball of the standing check valve seated. Thus, the travelling check valve is open and the standing check valve is closed on the down stroke. As the piston descends, fluid in the pump barrel bore moves through the travelling check valve, into the piston bore, and on up into the tubing bore. When the piston reaches the bottom of its down stroke and reverses into the up stroke, the ball of the travelling check valve seats, thereby trapping the fluid standing above it. Thus, as the piston rises, fluid above the travelling check valve is lifted upwardly. At the same time, the low pressure created by the upward stroke of the piston causes the ball of the standing valve to unseat and oil is drawn in from the well bore and reservoir. Fluid from the well bore thus follows the rising piston by passing through the standing check valve and entering the barrel bore. This stroking sequence is repeated again and again to gradually lift a fluid column to ground surface.

In wells where gas or vapour are produced along with liquid, the pump can be subject to poor efficiency due to gas lock. Gas lock occurs when gas is trapped between the standing and travelling check valves. On the down stroke, the hydrostatic weight of fluid above the pump tends to keep the travelling check valve closed. The gas trapped in the pump barrel compresses as the piston descends, but does not achieve enough pressure to open the travelling check valve. (If there were incompressible liquid alone in the barrel bore, the pressure would rise sufficiently to unseat the travelling check valve ball, as previously stated.) The trapped gas does, however, create enough pressure in the barrel bore to hold the standing check valve closed, so new fluid may not enter the pump. The end result of the foregoing is that the gas-locked pump fails to move fluid. In addition, heat build-up due to the lack of lubricating fluid may damage the check valves.

A number of solutions to eliminate gas lock have been tried in the prior art, each entailing a number of disadvantages.

One solution is to physically "tap down" the pump by lowering the piston to the bottom of the barrel bore. This rattles the check valves, so that the travelling check valve ball is unseated and gas can escape upwardly. However, this can damage pump components. Also, it is difficult to tap the pump, as the above-ground pumping unit must be disconnected and adjusted to cause the piston to over-travel and tap the barrel.

Another solution is shown in U.S. Pat. No. 4,867,242 to Hart. This patent involves an assembly adapted to automatically trip the travelling check valve open as the piston approaches the bottom of the down stroke. An unseating rod is positioned above the standing check valve and is adapted to protrude into the travelling check valve to unseat the ball near the bottom of the down stroke. However, striking the ball with the unseating rod again and again damages the sealing surface of the ball, reducing the life of the travelling check valve. Also, the unseating rod restricts the flow passage to such an extent that the flow capacity of the pump is significantly reduced. As well, this arrangement cannot be fitted to standard pumps.

Finally, the inventors are aware that competitors have publically tried another solution, involving automatically tripping the travelling check valve at the beginning of each down stroke. It involves a port sub carried by the travelling check valve with a push-rod held against its ball. A sliding keep sleeve allows the piston sleeve and port sub to be fully extended on the up stroke or fully compressed on the down stroke. While this device may be fitted to a standard pump, it still suffers the disadvantages of the rod damaging the ball and significantly reducing the flow capacity of the pump.

Thus, there remains a need for modification of a down-hole reciprocating pump which successfully deals with the problem of gas lock without reducing the pumping capacity of the pump.

SUMMARY OF THE INVENTION

The present invention pertains to a down-hole reciprocating pump which is adapted to eliminate gas locking, without damage to the sealing surface of the travelling check valve or restricting pump flow capacity. Any standard pump may be readily adapted to the present invention.

The key to the invention lies in the provision of a guided travelling check valve having a valve member comprising an axially extending lower stem. Stationary trip means, such as a transversely extending pin, are provided in the pump barrel above the standing check valve in alignment with the lower stem of the travelling check valve, for contacting the lower stem to trip the travelling check valve open. The depth of travel of the piston in the pump may be set so that the trip means contacts the lower stem and automatically opens the travelling check valve by unseating the valve member as the piston approaches the bottom of it's down stroke, or so that it will be tripped if the pump is tapped. Either way, this allows any gas or vapour trapped between the pump check valves to escape through the travelling check valve.

The present invention comprises a down-hole reciprocating pump for use in a well, said pump comprising a tubular barrel, a tubular piston sealably and slidably received in the barrel and adapted to be reciprocated therein by a rod string, the piston forming a longitudinal bore and having an internal travelling check valve for controlling the movement of fluid through the bore, the barrel forming a longitudinal bore and having an internal standing check valve at its lower end for controlling entry of fluid into its bore, characterized in that the travelling check valve is positioned at the lower end of the piston and comprises a housing containing a cage, an annular seat member and a valve member positioned in the cage and adapted to seal against the seat member to close the valve; the valve member has centrally located upper and lower stems extending axially from its upper and lower ends; the seat member and cage each carry centrally apertured guide means for receiving and guiding the stems to centralize the valve member; the lower stem extends below the guide means of the seat member when the travelling valve is closed; and the barrel carries stationary trip means, adjacent to but above the standing check valve and aligned with the lower stem, for contacting and stopping downward travel of the lower stem at about the bottom of the piston down stroke to thereby temporarily open the travelling check valve by unseating its valve member.

Because the trip means contact or stop the lower stem of the travelling valve member instead of the valve member itself, the sealing surfaces of the valve member are not damaged. Also, the flow capacity of the pump is not significantly affected, because the lower stem of the valve member is fixed to and under the guided valve member. Since the trip means is provided in a preferred form as a transverse pin extending across the upper end of the bore of the upper sub of the standing check valve, it is a simple matter to incorporate the present invention into an existing standard A.P.I. pump. Merely the travelling check valve and upper sub of the standing check valve need be replaced.

DESCRIPTION OF THE PREFERRED EMBODIMENT

Figure 1:
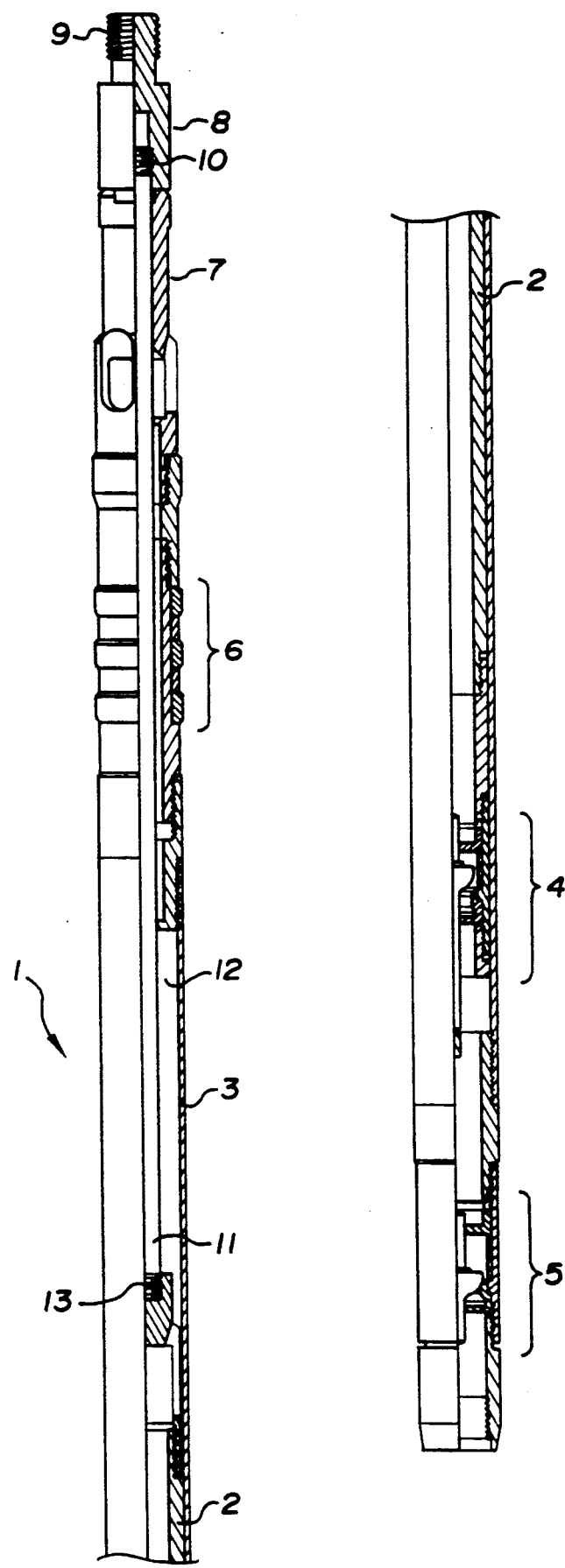
FIG. 1 is a side-sectional view of a down-hole reciprocating pump according to a preferred embodiment of the present invention.

The down-hole reciprocating pump of the present invention as shown in FIG. 1 is indicated generally as 1.

The pump 1 comprises a tubular piston 2 adapted for reciprocal movement in a tubular pump barrel 3. An internal travelling check valve 4 reciprocates with the piston 2. The bottom of the pump barrel 3 carries an internal standing check valve 5.

The pump barrel 3 is threadably connected at its upper end to a hold-down assembly 6, which is in turn threadably connected to a mandrel 7. Alternatively, the hold-down assembly 6 could be located at the lower end of the pump barrel 3. The hold-down assembly 6 is a friction cup assembly which seats the pump 1 in the seating nipple of a tubing string of a well (neither shown), as is known in the art.

A bushing 8 rests on the mandrel 7 when the pump 1 is bottomed out, as shown in FIG. 1. The bushing 8 may be threadably connected by upper threads 9 to a downhole sucker rod string (not shown), and by lower threads 10 to a pull rod 11. The pull rod 11 extends into the bore 12 of the barrel 3, and is threadably connected by threads 13 to the piston 2. Thus, the piston 2 may be reciprocated in the pump barrel 3 downhole a preset distance by reciprocating the sucker rod string from the surface.

Figure 2:
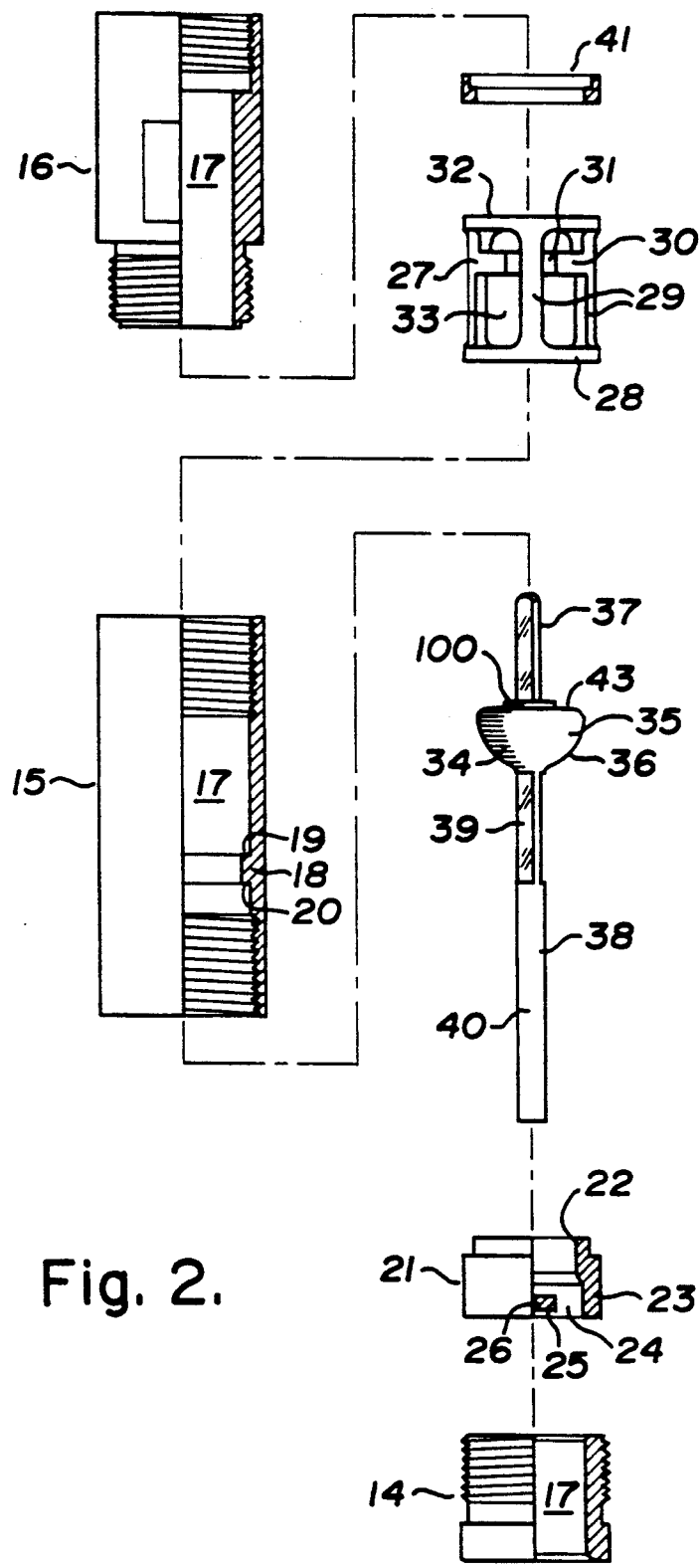
FIG. 2 is an exploded side-sectional view showing the components of the travelling check valve of the embodiment shown in FIG. 1, with broken lines indicating the manner of assembly.
Figure 9:
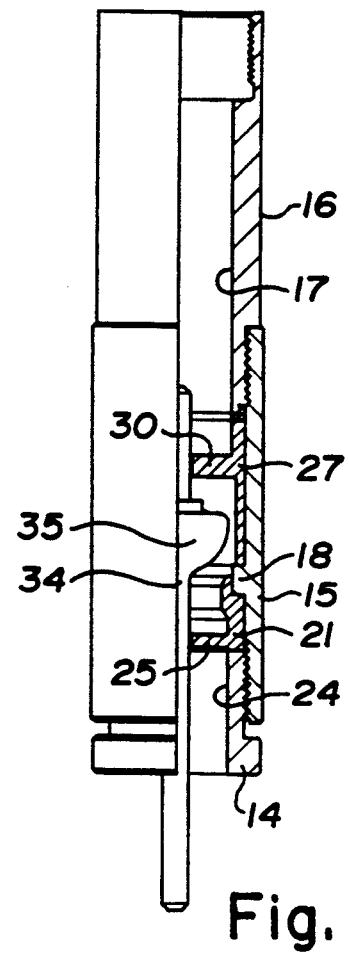
FIG. 9 is a side sectional view of the travelling valve of FIG. 2 when assembled.

The travelling check valve 4 of the piston 2 is shown in exploded form in FIG. 2 and in assembled form in FIG. 9. It comprises an outer housing formed by a nose sub 14, a valve barrel 15 and a top sub 16. The housing is generally tubular in form, having a bore 17. The nose sub 14, valve barrel 15 and top sub 16 screw thread together end to end.

Along its length, the valve barrel 15 forms an inwardly projecting, reduced diameter portion 18 having top and bottom shoulders 19 and 20.

A tubular seat member 21 is inserted into the valve barrel 15 from the bottom, abuts the shoulder 20 and is locked in place by the nose sub 14. The seat member 21 is rounded or bevelled at its inner top edge to form an annular seat 22.

A lower portion 23 of the seat member 21 is relatively thin walled, to provide a relatively large bore 24. A web 25 extends diametrically across the bore 24 and is connected with the thinned side wall of the portion 23. The web 25 forms a central aperture 26.

A hollow, cylindrical cage 27 is inserted into the valve barrel 15 from the top and abuts the shoulder 19. The cage 27 has a bottom connector 28, three upstanding, equally spaced apart ribs 29 and a transverse web 30 downwardly spaced from their upper ends. The web 30 forms a central aperture 31. The ribs 27 are joined by an upper connector 32. Flow windows 33 are formed between the ribs 29.

The valve barrel 15 is of solid one-piece construction and contains and supports the seat member 21 and cage 27 along their outer surfaces. The seat member 21, in contact with the bottom shoulder 20 of the reduced diameter portion 18 of the barrel 15, provides an outer bottom seal to prevent the escape of fluid around the valve member seal.

A plunger 34 is positioned to seat against the seat 22 and to reciprocate within the cage 27. The plunger 34 comprises a semi-spherical valve member 35 having a rounded seal surface 36 adapted to form a line contact seal with the seat 22. The seal surface 36 is adapted to seal against the barrel of the seat 22 near the top of the bevel of the seat 22, so that as the seal surface 36 wears it will continue to seal, further down the bevelled seat 22. The valve member 35 is relatively small, so that it is inwardly spaced from the ribs 29 of the cage 27. The valve member 35 has a central spacer 100, for spacing its main body downwardly from the cage web 30, when the valve is fully open.

The valve member 35 has axially extending, centrally located, upper and lower stems 37 and 38. As shown, the upper stem 37 and a first portion 39 of the lower stem are straight-sided. Thus clearances are formed between the stems 37, 38 and the web apertures 26, 31, so that solids build-up between the stems and the walls of the webs is negligible. In addition, the stems 37, 38 have a loose fit in the web apertures 26, 31 to enable the valve member 35 to "work" its way down into the annular seat 22.

The lower portion 40 of the lower stem 38 is elongated. It extends below the web 25 of the seat member 21 and the nose sub 14, both when the travelling check valve 4 is open or closed.

A conventional annular damper 41 is provided to seal between the top sub 16 and the valve barrel 15.

Figure 3:
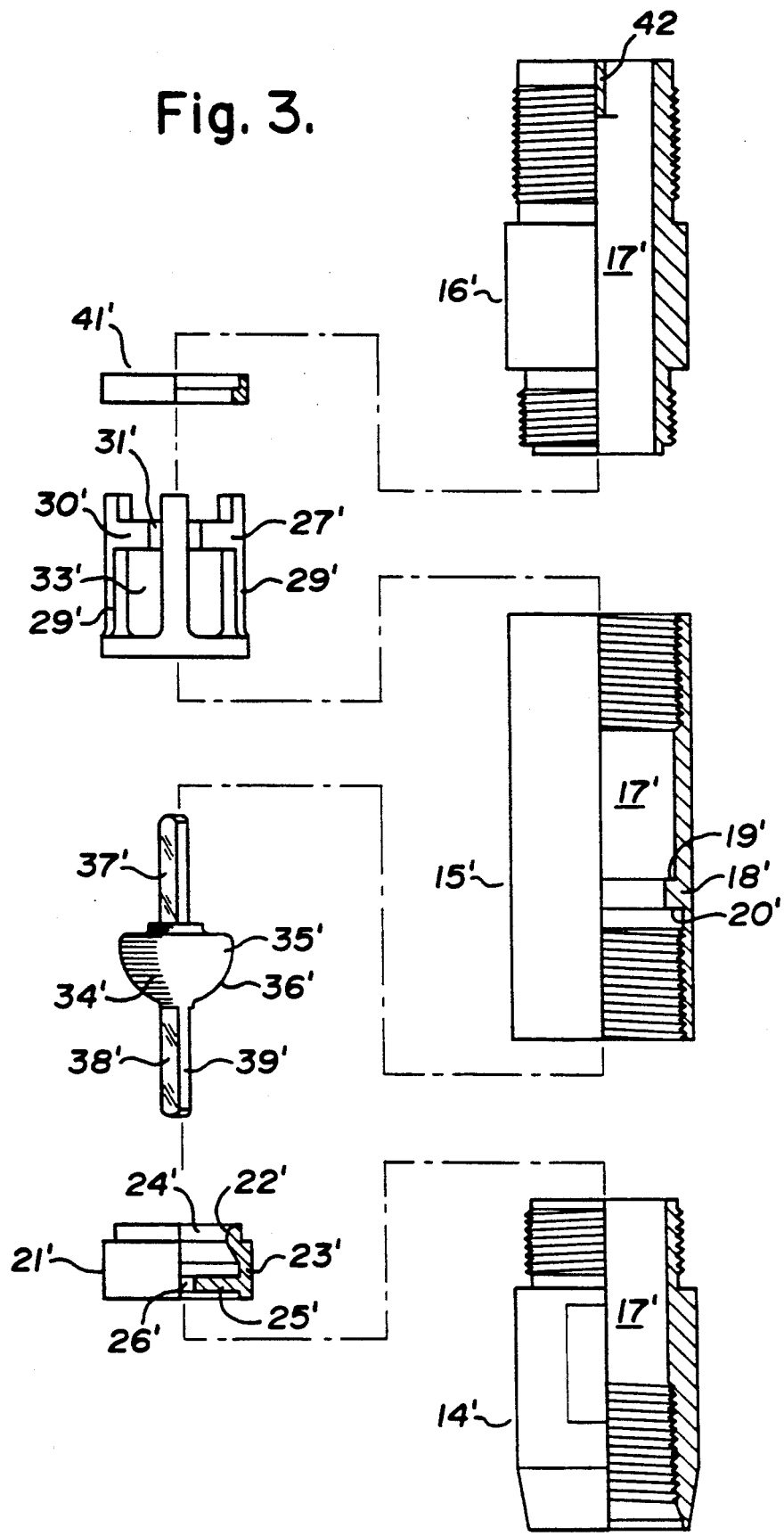
FIG. 3 is an exploded side-sectional view showing the components of the standing check valve of the embodiment shown in FIG. 1, complete with trip sub, with broken lines indicating the manner of assembly.

The standing check valve 5 is shown in exploded form in FIG. 3. Components of the standing check valve 5 which are the same as components of the travelling check valve 4 are indicated by like prime numerals. Save for the following, the prior description of the travelling check valve 4 applies to the standing check valve 5.

Figure 4:
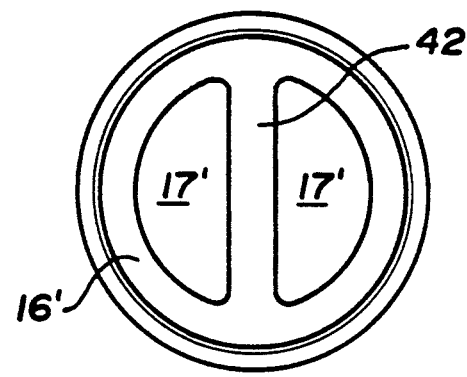
FIG. 4 is a cross-section of the trip sub of the standing check valve in FIG. 3, taken along the line 4—4 as shown.

In the standing check valve 5, the top sub 16' has a transverse pin 42 bisecting the bore 17'. The pin 42 is shown in cross-section in FIG. 4.

As shown, the cage 27' does not have an upper connector. Also, the sealing surface 22' of the seat 21' is curved rather than bevelled, for a radius-on-radius seal with the plunger seating surface 36'. This shows two variations which may be present in both the standing and travelling check valves 4 and 5. However, incorporation of an upper connector is preferred, to prevent the ribs 29 and 29' from cutting into the dampers 41 and 41'. Also, a bevelled seat 22 is easier to machine than a curved seat 22'.

The lower stem 38' of the plunger 34' does not have a lower extension corresponding to stem portion 40 forming part of the travelling check valve 4. Instead the stem 38' has only a straight sided portion 39' corresponding to portion 39 of the lower stem 38 of the travelling check valve 4. The nose sub 14' is longer than the nose sub 14, and the stem 38' does not extend into the nose sub 14' when the standing check valve 5 is assembled.

The depth of travel of the piston 2 in the pump 1 may be set in several ways. First of all, it may be set so that the travelling check valve 4 automatically trips open as the piston 2 approaches the bottom of it's down stroke. This would be desirable in a well which is known to have a gas lock problem. If so, it is preferred to set it so that it is tripped only part way open. This avoids having the top 43 of the valve member 35 strike the web 30 of the cage 27, which may cause wear.

Alternatively, the depth of travel of the piston 2 in the pump 1 may be set so that the travelling check valve 4 is only tripped open when the pump is tapped down. This may be desirable for use in a well which does not have a history of gas locking, to give the pump the capability of opening the travelling check valve 4 if necessary. If gas locking occurs, the pump can then be tapped from the surface by adjusting the positioning of the rod string so that the stem 38 strikes the pin 42 to unseat the valve member 35. The present pump is better suited to tapping, as damage to pump components from tapping is less likely when an extended stem guided valve and trip pin are used.

The length of the pull rod 11 must be set to give the pump 1 the capability to be tripped automatically by the travelling valve 4 and pin 42. This is done by cutting the pull rod 11 so that when it is threadably connected by lower threads 10 to the bushing 8 and the pump 1 is bottomed out with the bushing 8 resting on the mandrel 7, the stem 38 is positioned so that it contacts the pin 42.

Figure 5:
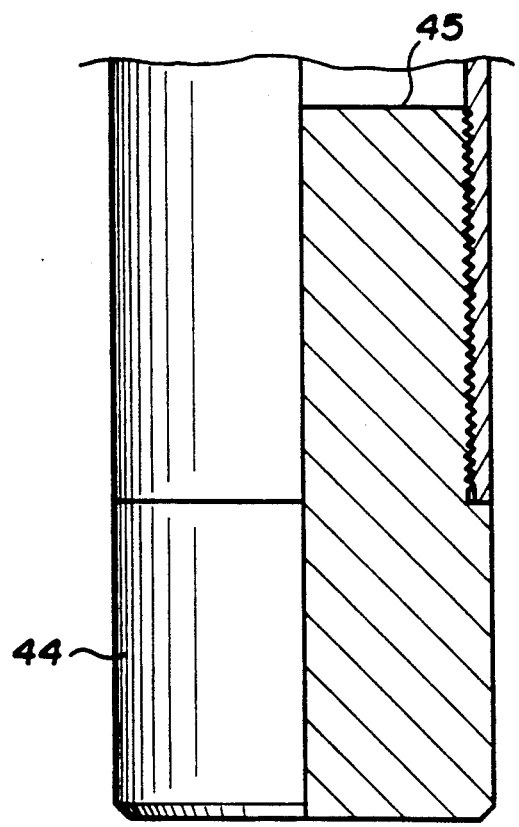
FIG. 5 is a side-sectional view of a setting tool for setting the pump.

A setting tool 44, as shown in FIG. 5, may be used to assist in cutting the pull rod 11 to the appropriate length.

The setting tool 44 is designed so that it may be threadably connected to the bottom of the pump barrel 3 in place of the standing check valve 5. The top surface 45 of the setting tool 44 extends into the pump barrel 3 below the location of the pin 42 when the standing check valve is in place by an amount less than the length of the travel of the plunger 34 from the fully open to the fully closed position of the travelling check valve 4.

The pump 1 complete with the setting tool 44 is then assembled with an uncut pull rod 11 extending out the top of the mandrel 7. The travelling check valve 4 is bottomed out on the setting tool 44 as far down as it will go with the travelling check valve 4 fully open and the stem 38 resting on the setting tool 44. Then the pull rod 11 is cut, threaded and threadably connected to the bushing 8 to make the bushing 8 tight to the mandrel 7. The setting tool 44 may then be removed, and the standing check valve 5 complete with the pin 42 put into place.

Figure 6:
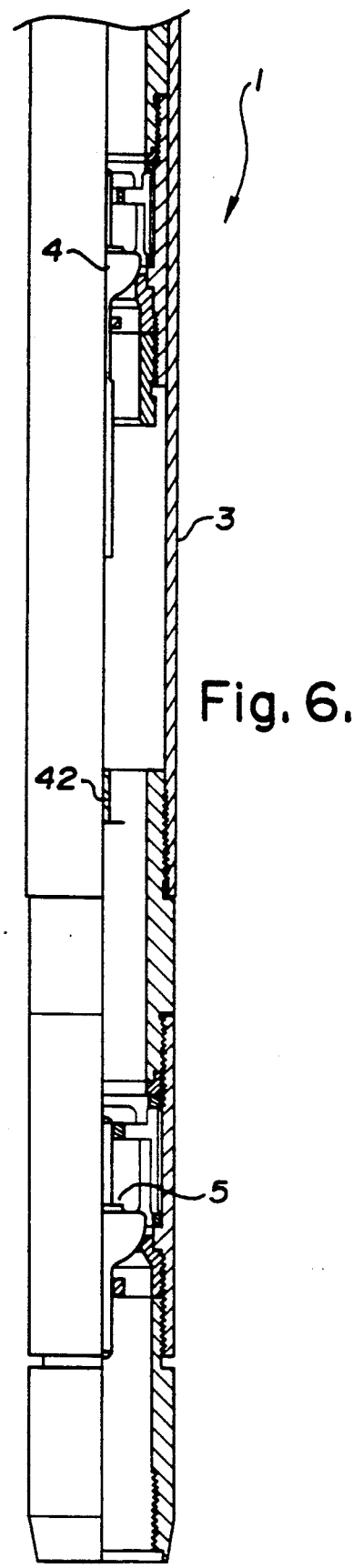
FIG. 6 is a side-sectional view showing part of the pump in FIG. 1, on the down stroke with gas trapped between the valves.
Figure 7:
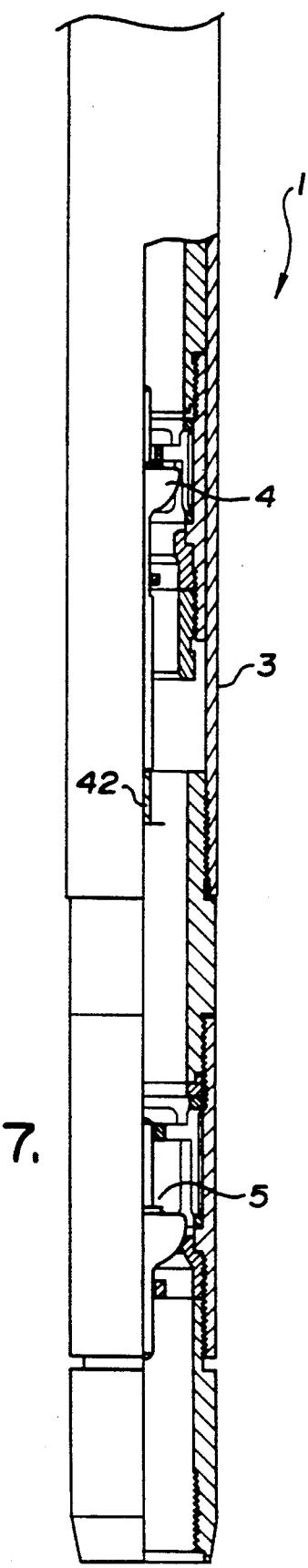
FIG. 7 is a similar view of the pump as in FIG. 6, but at the bottom of the down stroke, with the travelling check valve tripped open by the trip sub.
Figure 8:
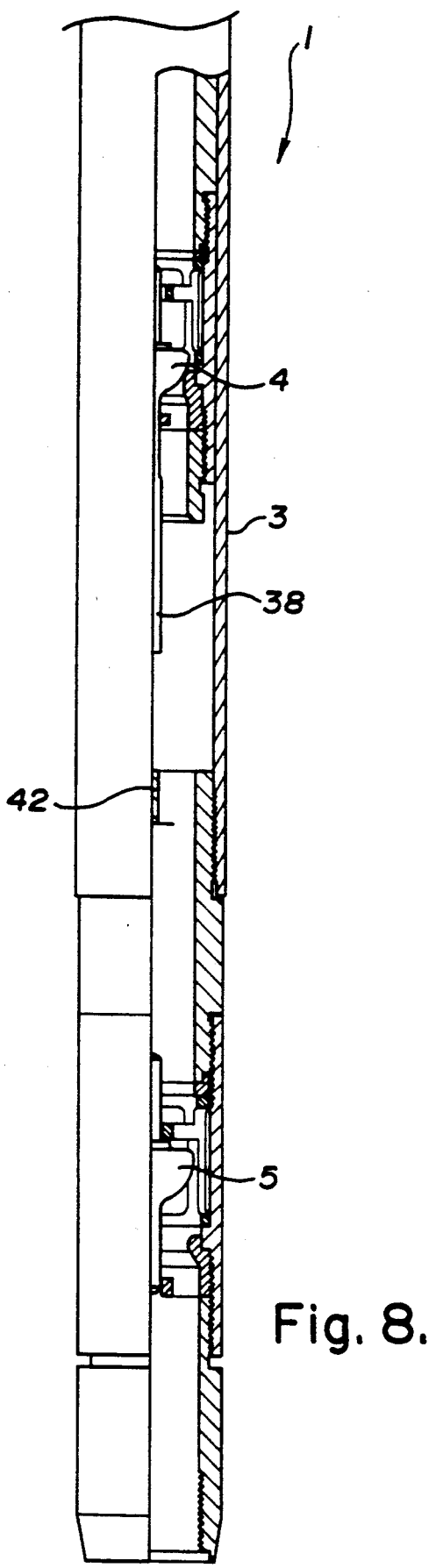
FIG. 8 is a similar view of the pump as in FIG. 6, but on the up stroke.

In operation, the pump 1 of the present invention, with the depth of travel of the piston 2 set so that the pump 1 automatically trips on each down stroke, is shown in FIGS. 6, 7 and 8 in a gas-locked condition.

In FIG. 6 the pump 1 is on the down stroke with the standing check valve 5 closed. Gas is trapped in the pump barrel 3 between the travelling and standing check valves 4 and 5. As a result, as the piston 2 travels downwardly, the travelling check valve 4 remains closed. The pressure of the compressed gas is insufficient to open the travelling check valve 4, given the hydrostatic head of the fluid above.

In FIG. 7, the pump 1 is at the bottom of the down stroke. The lower stem 38 of the travelling check valve 4 has contacted the pin 42 of the top sub 16' of the standing check valve 5, to trip the travelling check valve 4 partly open. Thus, the trapped compressed gases can escape through the travelling check valve 4.

Finally in FIG. 8, the pump 1 is on the up stroke. The standing check valve 5 has unseated as the low pressure created in the barrel 3 by the rising piston 2 draws fluid from beneath the standing check valve 5 through it and up the barrel 3.

The pump 1 set on automatic trip works equally as well in the absence of gas lock. In the absence of gas lock, the travelling check valve 4 opens on the down stroke to admit the fluid between the travelling and standing check valves 4 and 5 to above the travelling check valve 4. That the travelling check valve 4 is tripped open at the bottom of the down stroke does not affect the normal operation of the pump 1.

The embodiments of the invention in which an exclusive property or privilege is claimed are defined as follows:

1. A down-hole reciprocating pump for use in a well, said pump comprising a tubular barrel, a tubular piston sealably and slidably received in the barrel and adapted to be reciprocated therein by a rod string, the piston forming a longitudinal bore and having an internal travelling check valve for controlling the movement of fluid through the bore, the barrel forming a longitudinal bore and having an internal standing check valve at its lower end for controlling entry of fluid into its bore, characterized in that:

the travelling check valve is positioned at the lower end of the piston and comprises a tubular one-piece barrel having a longitudinal bore containing a hollow cylindrical cage forming an internal chamber having a bottom inlet and top outlet, a tubular seat member forming a longitudinal bore, and a valve member positioned in the cage and adapted to seal against the seat member to close the valve, the length of the cage chamber being sufficient to allow the valve member to be displaced upwardly off the valve seat to open a flow passage extending through the check valve;

the valve member has centrally located upper and lower stems extending axially from its upper and lower ends;

the seat member and cage each carry centrally apertured guide means for receiving and guiding the stems to centralize the valve member;

the lower stem extends below the guide means of the seat member when the travelling valve is closed; and the barrel carries stationary trip means, adjacent to but above the standing check valve and aligned with the lower guide stem, for contacting and stopping downward travel of the lower stem at about the bottom of the piston stroke to thereby temporarily open the travelling check valve by unseating its valve member.

2. The pump as set forth in claim 1, wherein:
   the lower stem of the travelling valve extends below the bottom of the housing of the travelling check valve when the travelling valve is closed; and
   the trip means comprises a stationary pin extending transversely across the bore of the barrel.

3. The pump as set forth in claim 1 wherein the valve member is generally semi-spherical.

4. The pump as set forth in claim 1 wherein each stem and associated guide means have a clearance therebetween for enabling sand particles to pass therethrough.

5. The pump as set forth in claim 3 wherein each stem and associated guide means have a clearance therebetween for enabling sand particles to pass therethrough.

6. The pump as set forth in claim 1 wherein the cage has upstanding, spaced apart ribs forming its side wall and defining flow windows therebetween.

7. The pump as set forth in claim 6 wherein the cage has only three ribs and the upper guide means is spaced downwardly from the top ends of the ribs to open up the top outlet of the cage.

8. The pump as set forth in claim 3 wherein the cage has only three ribs and the upper guide means is spaced downwardly from the top ends of the ribs to open up the top outlet of the cage.

9. The pump as set forth in claim 5 wherein the cage has only three ribs and the upper guide means is spaced downwardly from the top ends of the ribs to open up the top outlet of the cage.

10. The pump as set forth in claim 7 wherein the valve member has spacer means at its upper end for spacing it downwardly from the upper guide web when the valve is fully open.

11. The pump as set forth in claim 3 wherein the valve member has spacer means at its upper end for spacing it downwardly from the upper guide web when the valve is fully open.

12. The pump as set forth in claim 5 wherein the valve member has spacer means at its upper end for spacing it downwardly from the upper guide web when the valve is fully open.

* * * * *